US011338322B2

(12) United States Patent
Kucharska

(10) Patent No.: US 11,338,322 B2
(45) Date of Patent: May 24, 2022

(54) METHOD FOR COATING THE VISIBLE SURFACES OF MOTOR VEHICLE WHEEL RIMS

(71) Applicant: Beata Kucharska, Witten (DE)

(72) Inventor: Beata Kucharska, Witten (DE)

( * ) Notice: Subject to any disclaimer, the term of this patent is extended or adjusted under 35 U.S.C. 154(b) by 0 days.

(21) Appl. No.: 16/772,355

(22) PCT Filed: Dec. 11, 2018

(86) PCT No.: PCT/EP2018/084268
§ 371 (c)(1),
(2) Date: Jun. 12, 2020

(87) PCT Pub. No.: WO2019/115487
PCT Pub. Date: Jun. 20, 2019

(65) Prior Publication Data
US 2021/0078039 A1    Mar. 18, 2021

(30) Foreign Application Priority Data
Dec. 11, 2017   (DE) .................. 10 2017 129 434.1

(51) Int. Cl.
*B05D 5/06* (2006.01)
*B05D 1/02* (2006.01)
(Continued)

(52) U.S. Cl.
CPC .............. *B05D 5/067* (2013.01); *B05D 1/02* (2013.01); *B05D 3/0254* (2013.01); *B05D 5/068* (2013.01);
(Continued)

(58) Field of Classification Search
CPC ........ B05D 5/067; B05D 1/02; B05D 3/0254; B05D 7/577; B05D 2202/10;
(Continued)

(56) References Cited

U.S. PATENT DOCUMENTS 6,331,326 B1 * 12/2001 Tsunoda ................. B05D 5/068
427/202
7,235,167 B2    6/2007 Hentsch et al.
(Continued)

FOREIGN PATENT DOCUMENTS

DE    31 43 060 A1    5/1983
DE    102 42 555 A1    3/2004
(Continued)

OTHER PUBLICATIONS

International Search Report in PCT/EP2018/084268, dated Apr. 23, 2019.
(Continued)

*Primary Examiner* — William P Fletcher, III
(74) *Attorney, Agent, or Firm* — Collard & Roe, P.C.

(57) ABSTRACT

In a method for coating motor vehicle wheel rims, a polymer priming layer, a polymer intermediate layer, a decorative layer of a heat-cured polymer layer with embedded flake-like metal pigments covering the visible surface of the decorative layer, and a polymer cover layer are consecutively applied to the wheel rim metal surface. The coated wheel rims achieve a polished metal appearance by producing the polymer intermediate layer with a high-gloss surface and applying the decorative layer to the high-gloss surface of the polymer intermediate layer in the wet spraying method with a layer thickness of max. 2 μm, where it is dried at ambient temperature and, before applying the polymer cover layer, it is fixed to the polymer intermediate layer via a thermal post-treatment so that it adheres to the surface thereof with a cross-cut pull-off strength of Gt=0 to Gt=2.

5 Claims, 1 Drawing Sheet

(51) Int. Cl.
*B05D 3/02* (2006.01)
*B05D 7/22* (2006.01)
*B05D 7/00* (2006.01)

(52) U.S. Cl.
CPC .............. *B05D 7/576* (2013.01); *B05D 7/574* (2013.01); *B05D 2202/10* (2013.01); *B05D 2202/25* (2013.01); *B05D 2601/02* (2013.01)

(58) Field of Classification Search
CPC ............ B05D 2202/25; B05D 2601/02; B05D 2202/00; B05D 2601/08; B05D 2601/10; B05D 7/576; B05D 7/574; B05D 5/068; B05D 7/16; B05D 7/26; B05D 1/38; B05D 7/584; B05D 7/586; B05D 7/587; B05D 2202/15; B60B 2900/572
See application file for complete search history.

(56) References Cited

U.S. PATENT DOCUMENTS

| | | | |
|---|---|---|---|
| 7,507,440 B2* | 3/2009 | Reising | B05D 7/14 427/189 |
| 2006/0121191 A1 | 6/2006 | Tecker | |
| 2013/0071576 A1* | 3/2013 | Menzel | C23C 4/18 427/487 |

FOREIGN PATENT DOCUMENTS

| | | | | |
|---|---|---|---|---|
| DE | 10 2004 006 127 A1 | 8/2005 | | |
| DE | 10 2006 048 631 A1 | 4/2008 | | |
| EP | 2 123 366 A1 | 11/2009 | | |
| EP | 2123366 A1 * | 11/2009 | ............ | B05D 5/067 |
| JP | 2005-152841 A | 6/2005 | | |
| JP | 2007-126116 A | 5/2007 | | |
| WO | 2013/041395 A1 | 3/2013 | | |
| WO | 2017/083730 A1 | 5/2017 | | |

OTHER PUBLICATIONS

German Examination Report in DE 10 2017 129 434.1, dated Aug. 17, 2018, with English translation of relevant parts.
English Translation of Written Opinion of the International Searching Authority in PCT/EP2018/08268, dated Apr. 23, 2019.
DIN 67530 / ISO 2813, Paints and varnishes—Determination of gloss value at 20 degrees, 60 degrees and 85 degrees, BSI Standards Publication, 2014, 32 pages.
DIN EN ISO 2409, Paints and varnishes—Cross-cut test, International Standard, Third edition May 15, 2007, 16 pages.
Wikipedia article, "Gloss (optics)", https://en.wikipedia.org/wiki/Gloss_(optics), retrieved on Jan. 10, 2022, total of 6 pages.

* cited by examiner

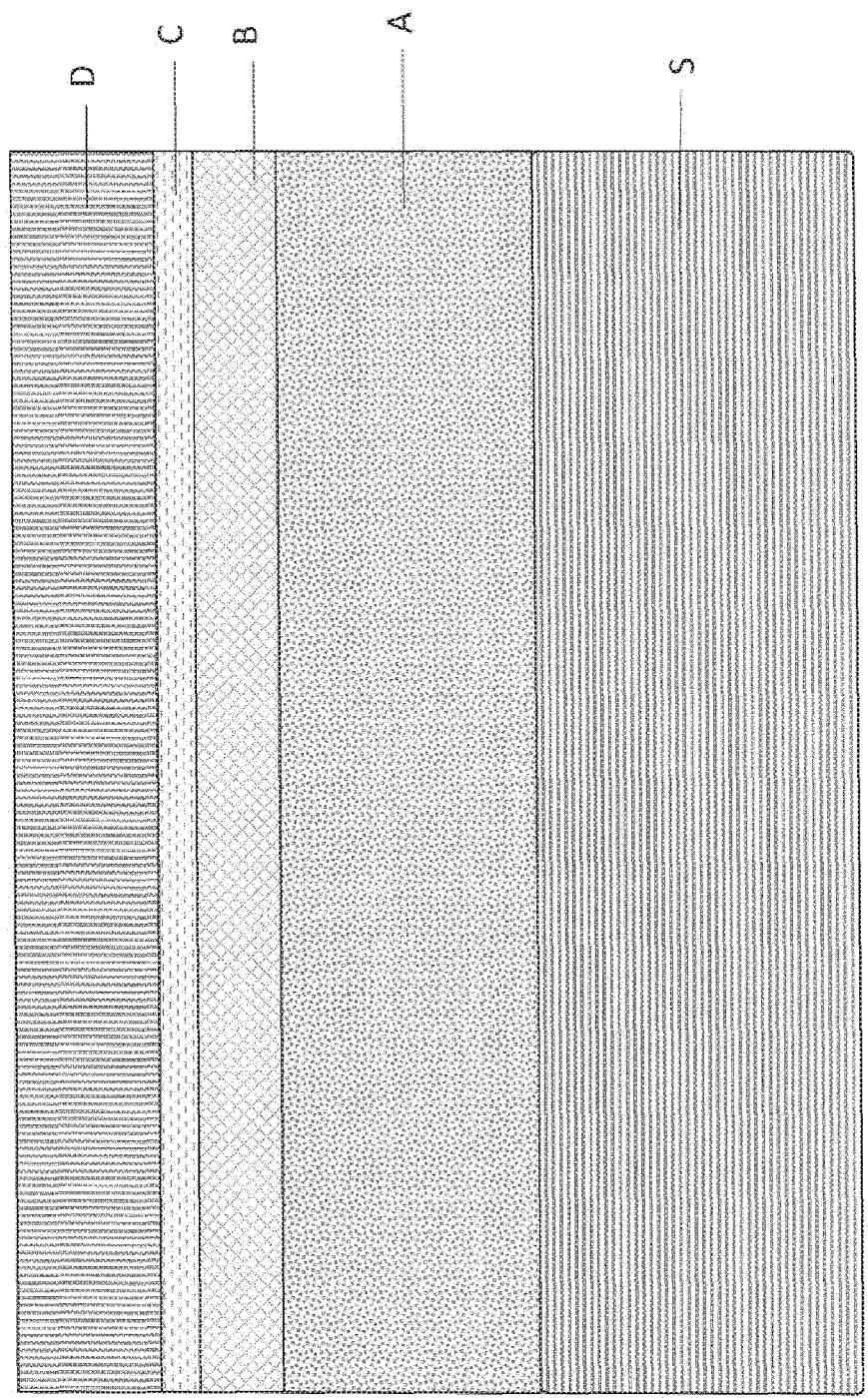

METHOD FOR COATING THE VISIBLE SURFACES OF MOTOR VEHICLE WHEEL RIMS

CROSS REFERENCE TO RELATED APPLICATIONS

This application is the National Stage of PCT/EP2018/084268 filed on Dec. 11, 2018, which claims priority under 35 U.S.C. § 119 of German Application No. 10 2017 129 434.1 filed on Dec. 11, 2017, the disclosure of which is incorporated by reference. The international application under PCT article 21(2) was not published in English.

BACKGROUND OF THE INVENTION

1. Field of the Invention

The invention relates to a method for coating the visible surfaces of motor vehicle wheel rims made of aluminum or steel, in which firstly a polymer base layer (A) is applied to the mechanically processed metallic surface of the rim, said layer compensating for the unevenness of the mechanical processing, following which an intermediate polymer layer (B) is applied to the surface of the polymer base layer (A), then a decorative layer (C) is applied to the surface of the polymer intermediate layer (B), said decorative layer (C) consisting of a heat-cured polymer layer with embedded platelet-shaped metal pigments covering the visible surfaces of the decorative layer (C), and finally the surface of the decorative layer is covered with a polymer top layer (D).

2. Description of the Related Art

Such a method is known for example from EP 2 123 366 A1.

To the extent that the present patent application refers to polymer coatings or layers, it refers to all paint coatings commonly used in automotive engineering whose physically or chemically curing film forming substances essentially consist of synthetic polymers, as, for example, alkyd resins, acrylic resins, epoxy resins, polyester resins, polyurethane resins, etc.

Another process as described in WO 2017/083730 A1, which is also known from other sources, provides for the metallically shiny decorative layer to be produced by the use of metal vapor in a PVD process. In this method, this metal vapour vapor layer is applied directly to the high-gloss surface of the polymer intermediate layer and finally coated with the polymer top layer. This coating process, which for physical reasons can only be realized in a vacuum at 10-4 to 10-5 mbar, requires complex apparatus in order to produce the vacuum and the metal vapor, so that this coating process is to be viewed extremely expensive. Furthermore, with the coating produced in this manner, there is the additional problem in the event of the polymer top layer (D) being damaged that the decorative layer underneath, which essentially consists only of metal, may cause to be damaged by oxide formation that undermines the polymer top layer (D).

In contrast, WO 2013 041395 A1 discloses a considerably more cost-effective method for producing a shiny metallic rim coating. In all this method, a polymer layer containing platelet-shaped metal pigments (flakes) is applied underneath the polymer top layer said layer being intended to create the metallic luster. Nevertheless, the visual appearance of the visible surfaces coated in this manner falls far short of the appearance that is achieved by a metallic surface that has been polished. Similar to the method according to EP 2 123 366 A1 mentioned above, this may be due to the fact that the platelet-shaped metal pigments do not align sufficiently parallel to the surface.

In contrast, a very good metallic luster can be achieved with the electroplating technology that is still the state-of-the-art approach, as described for example in publications DE 102 42 555 A1 or DE 10 2004 006 127 A1. However, as described in these publications, the electrochemical precipitation of metallic particles on the substrate or its coating is problematic in terms of environmental pollution and disposal expenses.

SUMMARY OF THE INVENTION

It is therefore the objective of the present invention to further develop the method of the kind first mentioned above in such a way that wheel rims coated according to this method achieve the appearance of polished metal without causing significant additional costs.

To achieve this object, the invention proposes, starting from the method of the type mentioned at the outset, that the polymer intermediate layer (B) is produced with a high-gloss surface with a gloss grade according to DIN67530/ISO2813 of more than 95 and that the decorative layer (C) is applied to the high-gloss surface of the polymer intermediate layer (B) by wet spraying with a maximum thickness of 2 μm and dried there at ambient temperature and, before application of the polymer cover layer (D), is fixed to the polymer intermediate layer (B) by a thermal aftertreatment such that it adheres to the surface with a cross cut tear strength according to DIN EN ISO 2409 from Gt=0 to Gt=2.

The visible surfaces of motor vehicle wheel rims made of aluminum or steel coated in accordance with the teachings of the invention surprisingly achieve, without any additional treatment steps needed, the appearance of polished metallic surfaces consisting of the metal of which the platelet-shaped metallic pigments consist that are used in the decorative layer. As a result, it is easily possible to provide the rims with a selectable metallic appearance, for example the appearance of polished metallic aluminum, polished copper, polished brass or polished stainless steel.

The effect thus achieved as proposed by the present invention is due to the fact that as a result of the high-gloss surface of the polymer intermediate layer, the special application technique (wet spraying process), the minor layer thickness (2 μm), the drying at ambient temperature and the subsequent thermal fixation the platelet-shaped metal pigments contained in the decorative layer (C) are kept parallel to the high-gloss surface of the polymer intermediate layer to such an extent that they remain substantially parallel to this high-gloss surface during the final application of the covering polymer top layer (D) and thus retain the optical impression of a coherent, polished metallic surface. The high cross-cut pull-off strength lends the necessary cohesion to the entire coating system.

It is of special advantage that for the method proposed by the invention no vacuum systems or galvanic baths are needed and that hardly any oxidative damage to the metal pigments is to be feared in the event of the polymer top layer being damaged, because each of them is safely embedded in the polymer of the decorative layer (C).

The thermal fixation of the decorative layer (C) is to be carried out at a minimum temperature of 140° C. Excellent fixation results are achieved if this thermal fixation is performed at temperatures ranging between 180° C. and 200° C. Certainly, at such low temperatures there is no risk of damage to the metal of the wheel rims.

An appropriate further development of the invention provides for additional color pigments to be added to the decorative layer (C). This enables the metallically shining look of the coating surface to be further enhanced with additional color nuances suited to complement the visual impression in a special way.

The impression of a polished metal surface is even perfected if appropriate measures are taken to the effect that the area of the decorative layer (C) which is covered by the platelet-shaped metallic pigments is absolutely gapless. To achieve this, it is expedient if the summarized surfaces of the platelet-shaped metal pigments contained in the decorative layer (C) that the observer looks at are at least by a factor of 3 larger than the surface of the decorative layer (C). This can be accomplished by introducing a sufficient amount of the platelet-shaped metal pigments into the film forming material of the decorative layer (C).

BRIEF DESCRIPTION OF THE DRAWINGS

An embodiment example of the invention is explained in more detail hereinafter on the basis of the drawing in which a section through an inventive coating system is illustrated.

In the FIGURE, the substrate to be coated, in this case a motor vehicle wheel rim made of aluminum or steel, is marked with the reference letter S.

DETAILED DESCRIPTION OF THE PREFERRED EMBODIMENTS

For the purpose of implementing the method proposed by the present invention, the surface of this substrate S to be coated is first treated by means of the usual mechanical processes, i.e. smoothed and cleaned to the extent possible.

Following this, a polymer primer layer A is applied to this surface of the substrate—with or without chemical pre-treatment—by adopting customarily known methods, said layer compensating for any unevenness the mechanical processing may have caused. This polymer primer layer A contains a sufficient amount of fillers to even out any coarse unevenness in the metallic surface of the substrate.

Subsequently, a high-gloss powder coating is applied to the surface of this polymer primer layer A which forms polymer intermediate layer B, said powder coating being described for instance in publication DE 31 43 060 C2. It is of major significance that the surface of this polymer intermediate layer B really has high-gloss characteristics, i.e. features a gloss level of more than 95 according to DIN 67530/150 2813. Basically, such high-gloss surfaces can be brought about by adopting various paint systems. For the method proposed by the invention, a PU powder coating system is preferably adopted for the polymer intermediate layer B.

A decorative layer C is subsequently applied to the polymer intermediate layer B, the film forming material of which is a thermally curable polymer that, for decorative purposes, contains platelet-shaped metal pigments, so-called flakes, said pigments covering the visible surface of the decorative layer C. This decorative layer C is applied to the high-gloss surface of polymer intermediate layer B by wet spraying at a maximum film thickness of 2 µm and consists of a coating compound which at this film thickness dries at an ambient temperature of between 15° C. and 25° C. in less than 10 seconds. After drying and by heating to a minimum temperature of 140° C., preferably of between 180° C. and 200° C., this coating compound is applied onto the high-gloss surface of the polymer intermediate layer B in such a way that a cross-cut pull-off strength of Gt=0 to Gt=2 as per DIN EN ISO 2409 specification is achieved on the surface of the polymer intermediate layer B.

Various kinds of coating compounds having these physical properties are available on the market.

The platelet-shaped metal pigments contained in the very thin decorative layer C as provided by the invention, are oriented in the inventive method substantially parallel to the high-gloss surface of the polymer intermediate layer B and in this manner create the visual impression of a coherent, polished metallic surface. As a result of the decorative layer C having been additionally applied onto the high-gloss surface of the polymer intermediate layer by the heating process explained hereinbefore, this orientation is retained even after the polymer top layer D has finally been applied.

The impression of a coherent polished metallic surface is considered to be optimal when the sum of the surfaces of the platelet-shaped metallic pigments contained in decorative layer C that the observer looks at is at least three times larger than the surface of decorative layer C.

In the event further decorative color effects are desired, additional colour color pigments can be added to the film forming material of decorative layer C.

The finally applied polymer top layer D possesses the usual properties of such coating systems and protects the entire coating including the coated substrate against mechanical damage such as stone chipping or the like.

The invention claimed is:

1. A method for coating the visible surfaces of motor vehicle wheel rims made or aluminum or steel, comprising:
    a polymer primer layer (A) is first applied to a mechanically processed metal surface of the wheel rim, which layer covers the irregularities of the mechanical processing;
    then a polymer intermediate layer (B) is applied to the surface of the polymer primer layer (A);
    then a decorative layer (C) is applied to the surface of the polymer intermediate layer (B), which decorative layer comprises a thermally cured polymer layer with embedded platelet-shaped metal pigments, which completely cover the visible surface of the decorative layer (C); and
    finally the surface of the decorative layer (C) is covered by a polymer topcoat (D),
    wherein
    the polymer intermediate layer (B) is produced with a high-gloss surface with a gloss grade according to DIN67530/ISO2813 of more than 95,
    the decorative layer (C) is applied by wet spraying with a layer thickness of a maximum of 2 µm to the high-gloss surface of the polymer intermediate layer (B), whereby the platelet-shaped metal pigments are aligned parallel to the high-gloss surface of the polymer intermediate layer (B),
    the decorative layer (C) is dried at ambient temperature,
    the decorative layer (C) is fixed on the high-gloss of the polymer intermediate layer (B) by a thermal post-treatment such that it adheres to the surface with a cross-cut tear strength according to DIN EN ISO 2409 of Gt=0 to Gt=2, and
    finally the polymer topcoat (D) is applied to the decorative layer (C).

2. The method according to claim 1, wherein the thermal post-treatment of the decorative layer (C) is carried out at a temperature of more than 140° C.

3. The method according to claim 1, wherein the thermal post-treatment of the decorative layer (C) is carried out at a temperature of 180° C. to 200° C.

4. The method according to claim 1, wherein color pigments are additionally added to the decorative layer (C).

5. The method according to claim 1, wherein the platelet-shaped metal pigments contained in the decorative layer (C) have surfaces facing the observer having a surface area greater by at least a factor of 3 than the area of the decorative layer (C).

* * * * *

UNITED STATES PATENT AND TRADEMARK OFFICE
CERTIFICATE OF CORRECTION

| | |
|---|---|
| PATENT NO. | : 11,338,322 B2 |
| APPLICATION NO. | : 16/772355 |
| DATED | : May 24, 2022 |
| INVENTOR(S) | : Beata Kucharska |

It is certified that error appears in the above-identified patent and that said Letters Patent is hereby corrected as shown below:

In the Claims

In Column 4, Line 32 (Claim 1) change "made or" to --made of--.

Signed and Sealed this
Sixteenth Day of August, 2022

Katherine Kelly Vidal
*Director of the United States Patent and Trademark Office*